March 18, 1941. M. BOSCH 2,235,474
SYSTEM FOR DIRECTLY TRANSFORMING THE FREQUENCY OF
POLYPHASE ALTERNATING CURRENTS
Filed Feb. 28, 1939   2 Sheets-Sheet 1

WITNESSES:

INVENTOR
Max Bosch.
BY
ATTORNEY

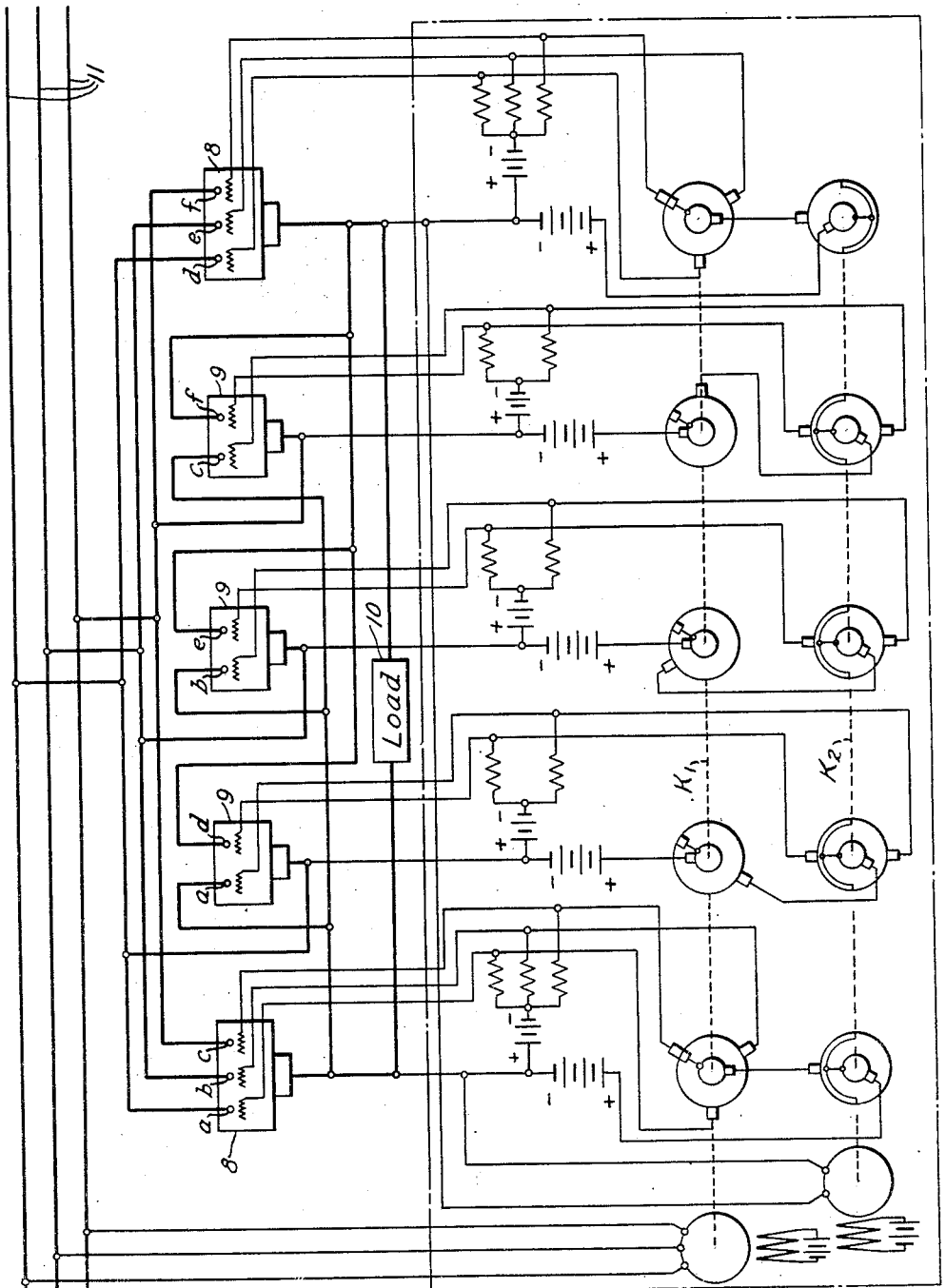

Patented Mar. 18, 1941

2,235,474

UNITED STATES PATENT OFFICE 2,235,474

SYSTEM FOR DIRECTLY TRANSFORMING THE FREQUENCY OF POLYPHASE ALTERNATING CURRENTS

Max Bosch, Berlin-Reinickendorf, Germany, assignor to Westinghouse Electric & Manufacturing Company, East Pittsburgh, Pa., a corporation of America Application February 28, 1939, Serial No. 258,944
In Germany March 1, 1938

6 Claims. (Cl. 172—281)

My invention relates to a frequency changer, and particularly, to a system for directly transforming the frequency of polyphase alternating currents.

Heretofore, when utilizing valve type converters, such as grid-controlled gas or vapor discharge devices, as frequency changers, it has been customary to arrange the valves in definite periodically active groups. For example, if a polyphase alternating current is to be transformed into a single-phase alternating current, the valves are arranged in two substantially independent groups, one of which conducts the positive half-cycle and the other the negative half-cycle of the single-phase current, the groups being controlled by ignition impulses displaced 180 electrical degrees.

It is an object of my invention to provide a conversion system in which the valves are connected in a completely different manner.

In the system according to my invention, the phase terminals fed by the alternating current to be transformed are connected through the valves which are so controlled that current paths are closed between two phase terminals of opposite polarity.

In comparison with known frequency changers, my system secures better utilization of the connecting transformers when such are used, or, if the voltages do not need to be changed, the connecting transformers may be dispensed with on either or both the input and load side. However, it is usually desirable to use some phase multiplying means on the input side. The use of an output transformer is only necessary in the event it is desired to change the load voltage.

A further advantage of the system according to my invention resides in the fact that in operation it produces a polyphase ripple having the shape of the voltage wave produced; for example, sine waves, without distortion by the input transformers.

A further advantage resides in the fact that there is a materially reduced stress across the discharge device composing the system.

The system according to my invention may be composed of either auxiliary mono-directional valves or valves which may conduct in either direction according to the control. In the latter case, the connections are very simple and reliable. With either type of valve, the discharge path always includes two valves in series. The valves for conducting the forward current are connected in pairs to each of the phase terminals of the supply circuit, one of each pair being connected to one side of the load circuit, and the other of each pair being connected to the opposite side of the load circuit, and where single directional valves are used, the return circuit comprises a pair of valves for each phase terminal of the supply circuit with one of each pair being connected to one side of the load circuit and the other one of each pair being connected to the opposite side of the load circuit.

It is accordingly an object of my invention to provide a simple system for directly changing the frequency of alternating currents.

It is a further object of my invention to provide a frequency converting system having a maximum utilization of the supply transformer.

It is a further object of my invention to provide a frequency converter connecting the load between two phase terminals of the supply through series connected discharge devices.

Other objects and advantages of my invention will be apparent from the following detailed description taken in conjunction with the accompanying drawings, in which:

Fig. 2 is a similar illustration of a modification using one-way valves connected according to my invention;

Fig. 1 shows an embodiment of the invention when transforming the frequency of a three-phase alternating current into a one-phase alternating current.

Figure 1:
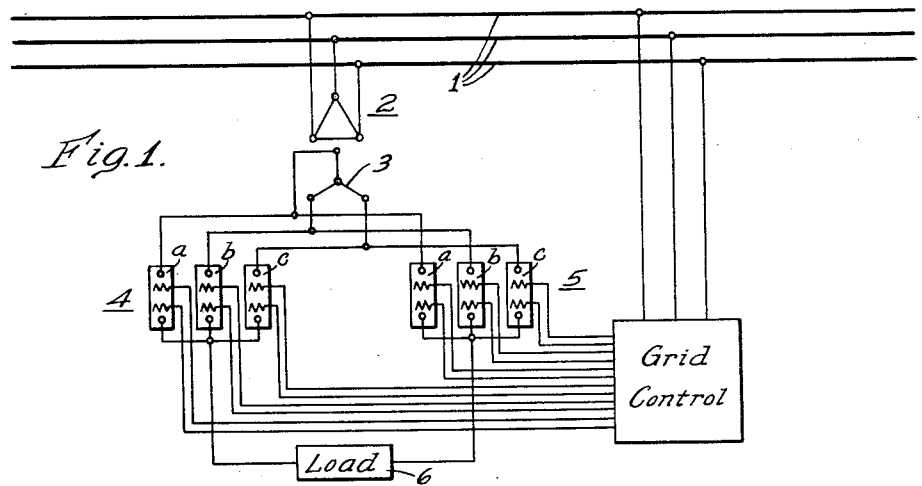
Figure 1 is a schematic illustration of a frequency changing system according to my invention.

The supply circuit 1 for the three-phase alternating current to be transformed feeds a transformer 2, the terminals of whose secondary winding 3 which is shown as star-connected is connected to the controllable discharge devices 4, 5 arranged at both sides of the current consuming device 6 and permitting the flow of energy in both directions. The schematical representation of a double grid for every discharge device is to indicate its controllability in both conducting directions. To each terminal of the secondary winding 3 is connected a discharge device 4 and a discharge device 5. The formation of a half wave of the single-phase alternating current produced is based upon the following scheme of the flow of current of the discharge device:

4a—5b, 4a—5c, 4b—5c, 4b—5a, 4c—5a, 4c—5b

In a similar manner the formation of the other half waves of the single-phase alternating current may be indicated by the following scheme of the flow of current:

5a—4b, 5a—4c, 5b—4c, 5b—4a, 5c—4a, 5c—4b

A particularly advantageous embodiment of the invention in which controllable gas and vapor filled discharge devices permitting the flow of energy in one direction are employed is shown in Fig. 2. The supply circuit 11 for the three-phase current to be transformed is directly connected to the discharge devices, the input transformer being here omitted. In this case the discharge devices are arranged in two discharge vessels 8 each having three anodes and in three discharge vessels 9 each having two anodes. As compared to the use of single-anode discharge vessels having one discharge device this arrangement presents constructional advantages and renders possible a symmetrical anode arrangement in which the backfires are reduced. Every three anodes belonging to different discharge vessels 9 are connected to one another and with the cathode of the one or the other three-anode discharge vessel 8. Connecting conductors establish connections between each phase conductor for the alternating current to be transformed and the cathode of each discharge vessel 9. There is also a conductive connection between each phase conductor for the three-phase current to be transformed and one anode of each discharge vessel 8. The current consuming device 10 is inserted again directly in the current branch common to all discharge devices. If the anodes of the individual discharge devices are denoted in the manner shown by the characters a, b, c, etc., the formation of a half wave of the single-phase alternating current is based upon the conductivity of the discharge devices according to the following scheme:

8a—9b, 8a—9c, 8b—9c, 8b—9a, 8c—9a, 8c—9b

The formation of the other half wave of the single-phase alternating current may be indicated by the following scheme:

8d—9e, 8d—9f, 8e—9f, 8e—9d, 8f—9d, 8f—9e, A₁

According to the invention the discharge devices when transforming the frequency of a three-phase alternating current into a single-phase alternating current are fed by six interlinked voltages of the transformer connected to the supply circuit for the alternating current to be transformed. In this case the six interlinked voltages consist of two three-phase voltage systems displaced with respect to one another by 30°. The result of such a feeding of the discharge devices is the introduction of a twelve-phase ripple into the controlled voltage curve, i. e., a smoothening of the same in the sense of a better adaptation, for instance, to the sine shape. To attain the above-mentioned voltage systems the secondary winding of the input transformer whose primary winding may be star or delta connected is changed into a star and delta connected system. A convenient way to obtain in many cases both voltage systems consists in forming according to the invention the secondary winding of the input transformer of a fundamental winding in delta or star shape and of additional part windings which are so arranged and connected to the fundamental winding that the voltages tapped from the additional winding are displaced ±15° with respect to those of the fundamental winding. In a particularly advantageous manner a transformer winding of the just described type may be directly connected in differential connection to the supply circuit for the three-phase current to be transformed, thus dispensing with a primary winding. In this case the primary network is connected to the star or delta points of the fundamental winding.

Figure 3:
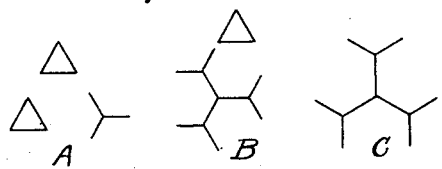
Fig. 3 is a diagrammatic illustration of various connections for securing multiplied phase operation.

In Fig. 3 is shown how the voltages produced by the individual windings are composed in the case of the above-described three forms of the input transformer. As to the second and third form it is assumed that the fundamental winding is star connected. As will be seen from the diagrams B and C the voltages produced by the fundamental winding and the additional winding are composed so as to form two voltage systems displaced 30° with respect to each other.

Figure 4:
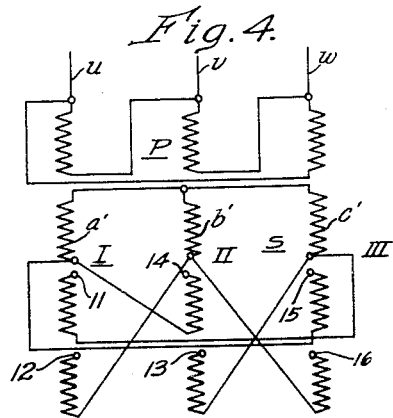
Fig. 4 is a schematic illustration of the connections according to Figs. 3B and C.

In Fig. 4 is shown an embodiment for that transformer connection which leads to a voltage diagram according to 3B. The primary winding P is delta connected. The secondary main voltage star is formed of the part windings a', b' and c'. The latter are arranged on the three different limbs of the iron core of the secondary winding S and star connected. Besides the winding a' or b' or c' each limb presents furthermore two equal additional windings with brought out connecting terminals 11 to 16. The additional windings are zig-zag connected to the fundamental windings a', b', c' in such a manner that each fundamental winding is connected to two additional windings which are carried by other limbs differing from each other. The discharge devices are connected to the terminals 11 to 16. When connecting the transformer in differential connection the primary winding P is omitted and the phase conductors for the alternating current to be transformed are connected to the terminals I, II and III.

When using singly arranged discharge devices permitting the flow of energy in one direction the discharge devices arranged according to the invention in pairs in opposite parallel connection in order to attain a twelve-phase ripple of the single-phase alternating voltage produced. Every six of such pairs are connected to the secondary terminal of the input transformer, whereas all discharge devices are connected to one end of a current branch common to all discharge devices. A further group of six discharge device pairs is connected to the other end of the current branch common to all discharge devices. If instead of using discharge devices permitting the flow of energy in one direction such ones permitting the flow of energy in two directions are employed a discharge device pair permitting the flow of energy in one direction is replaced by a discharge device permitting the flow of energy in two directions.

Any suitable phase multiplier or transformer may be utilized for increasing the effective phase terminals of the supply circuit and such devices as interphase transformers or current dividers may also be utilized for smoothing the ripple in the load circuit and for increasing the efficiency of the valves.

What is claimed is:

1. A frequency transforming system comprising a polyphase supply circuit having a plurality of phase terminals, a single phase load circuit, a plurality of pairs of parallel connected unidirectional electric valves connected between the polyphase circuit and the load circuit, said pairs of valves being equal in number to the phase terminals of the supply circuit, the anode end of each of said pairs of valves being connected to the same phase terminal of the supply circuit, said pairs of valves being arranged in two parallel groups, the cathode end of each group being connected to the opposite terminals of the load circuit, a plurality of reversely connected pairs of valves, said pairs of valves being arranged in a number of groups corresponding to the number of phase terminals of the supply circuit, the anode ends of each pair of reversely connected valves being connected to the opposite terminals of the load circuit and the cathode of said reversely connected pairs of valves being connected to the respective phase terminals of the supply circuit.

2. A frequency changing system for transferring energy from a polyphase supply system to a load circuit comprising two groups of electric valves, a plurality of phase terminals on said supply circuit, the valves of each of said groups being connected in parallel to the phase terminals of the supply circuit, and said groups of valves being connected in series with said load circuit.

3. A frequency changing system for transferring energy from a polyphase supply system to a load circuit comprising two groups of electric valves, a plurality of phase terminals on said supply circuit, the valves of each of said groups being connected in parallel to the phase terminals of the supply circuit, and said groups of valves being connected in series with said load circuit, and transformer means interposed between the polyphase circuit and the groups of valves for multiplying the effective phase terminals of the polyphase circuit.

4. A frequency conversion system for transferring energy between a polyphase supply circuit and a single phase load circuit comprising two groups of controlled electric valves, each group having valves equal in number to the phase terminals of the polyphase circuit, the cathode terminals of said valve groups being connected respectively to opposite terminals of the single phase circuit, the respective anode terminals of each of said valve groups being connected in parallel to the respective phase terminals of the polyphase circuit and return valves from each terminal of the single phase circuit to each terminal of the polyphase circuit.

5. A frequency changing system comprising a polyphase supply circuit, a single phase load circuit, a plurality of groups of controlled discharge devices interconnecting said circuits, said groups being connected in parallel to said polyphase circuit and in series with said single phase circuit and control means for opening current path in opposite directions in each of said groups of discharge devices.

6. A frequency changing system comprising a polyphase supply circuit, a load circuit operating at a different frequency than the supply circuit, two groups of electric valves, each group of valves having valves equal in number to the available phase terminals of the polyphase circuit, each valve group having a common cathode terminal and separate anode terminals, said load circuit being connected to said cathode terminals, the respective anode terminals of each group of valves being connected in parallel to the respective phase terminals of the polyphase circuit, a third group of valves, said third group of valves having a plurality of pairs of valves corresponding in number to the phase terminals of the polyphase circuit, each pair of valves having a common cathode connection, said cathode connections being respectively connected to the phase terminals of the polyphase circuit and a connection from each terminal of the load circuit to each pair of valves.

MAX BOSCH.